(12) United States Patent
Charlat

(10) Patent No.: US 7,074,512 B2
(45) Date of Patent: Jul. 11, 2006

(54) METHOD AND INSTALLATION FOR BLOWING OUT WATER IN A FUEL CELL HYDROGEN CIRCUIT

(75) Inventor: Pierre Charlat, Lans en Vercors (FR)

(73) Assignee: L'Air Liquide, Societe Anonyme A Directoire Et Conseil de Surveillance Pour l'Etude Et l'Exploitation des Procedes Georges Claude, Paris (FR)

( * ) Notice: Subject to any disclaimer, the term of this patent is extended or adjusted under 35 U.S.C. 154(b) by 476 days.

(21) Appl. No.: 10/149,028

(22) PCT Filed: Oct. 29, 2001

(86) PCT No.: PCT/FR01/03360

§ 371 (c)(1),
(2), (4) Date: Sep. 26, 2002

(87) PCT Pub. No.: WO02/41426

PCT Pub. Date: May 23, 2002

(65) Prior Publication Data

US 2003/0054211 A1    Mar. 20, 2003

(30) Foreign Application Priority Data

Nov. 14, 2000  (FR) .................................. 00 14654

(51) Int. Cl.
*H01M 2/00* (2006.01)

(52) U.S. Cl. ............................................ 429/34; 34/13

(58) Field of Classification Search ................... 429/12, 429/17, 14, 20, 26, 34
See application file for complete search history.

(56) References Cited

U.S. PATENT DOCUMENTS

| 5,366,821 | A | 11/1994 | Merritt et al. |
| 5,478,662 | A | 12/1995 | Strasser |
| 6,503,651 | B1 * | 1/2003 | Nguyen ........................ 429/34 |

FOREIGN PATENT DOCUMENTS

EP    0 692 835 A    1/1996

OTHER PUBLICATIONS

Patent Abstracts of Japan, vol. 015, No. 090, Mar. 5, 1991.
Patent Abstracts of Japan, vol. 2000, No. 15, Apr. 6, 2001.

* cited by examiner

*Primary Examiner*—Patrick Joseph Ryan
*Assistant Examiner*—Ben Lewis
(74) *Attorney, Agent, or Firm*—Young & Thompson

(57) ABSTRACT

The installation comprises cells which are comprised each of two anode compartments ($4_1$ and $4_2$), a connection between the outlet ($9_1$) of the first anode compartment and the inlet ($8_2$) of the second anode compartment, a connection between the outlet ($9_2$) of the second anode compartment and the inlet ($8_1$) of the first anode compartment, a circuit (10) for supplying hydrogen to the anode circuits of the cells by two branches in parallel ($11_1$ and $11_2$) controlled by two opening-closing members ($12_1$ and $12_2$), elements periodically control the reversal of the condition of the members.

7 Claims, 2 Drawing Sheets

METHOD AND INSTALLATION FOR BLOWING OUT WATER IN A FUEL CELL HYDROGEN CIRCUIT

CROSS REFERENCE TO RELATED APPLICATION

This is the 35 USC 371 national stage of international application PCT/FR01/03360 filed on 29 Oct. 2001, which designated the United States of America.

FIELD OF THE INVENTION

The present invention relates to the technical field of fuel cells and relates more particularly to cells of the type using, as combustion supporter, air enriched or not in oxygen, or even pure oxygen and, as fuel, hydrogen.

The structures of fuel cells of the above type are known as well as their principle of operation which involves the consumption of hydrogen in the anode compartment.

BACKGROUND OF THE INVENTION

Such operation is characterized by the production in the anode circuit of water, nitrogen diffusing through the membrane separating the anode compartment from the cathode compartment, as well as possibly impurities initially present in the hydrogen and which tend to concentrate.

So as to maintain optimum operating conditions, water, nitrogen and impurities are eliminated by proceeding generally to regular purges of the hydrogen circuit.

The frequency of the necessary purges depends on the characteristics of the cell as well as the operating cycles and can range from several seconds to several minutes.

One of the operating characteristic of such cells is also to leave, at the outlet of the anode circuit, a residual quantity of unconsumed hydrogen which is thus lost if the elimination of water, nitrogen and impurities is carried out by periodic purges.

So as to avoid a loss of hydrogen, the prior art ensured a recirculation of the mixture from the outlet of the anode compartment to reinject it at the inlet of the same compartment of the cell. Such a reinjection ensures continued mixing of the gases and improves the operation in the presence of impurities and nitrogen but however does not solve the problem of recovery of the water which is to be recovered so as to promote the hydraulic balance of the operation, particularly to ensure moistening and/or cooling of the cells.

The choice of proceeding with recirculation of the mixture requires using particular technical means and, particularly, the presence of a circulator which constitutes a rotary machine that is relatively complicated and subject to sensitive operating conditions, particularly in the presence of liquid water.

Such a rotary machine constitutes costly equipment, requiring substantial maintenance and, as a result, substantially increasing the purchase price as well as the operating cost of a fuel cell.

Moreover, it has been noted that the recirculation of mixture does not always improve the conditions effective to eliminate water, particularly when the speed of the principal gaseous mixture is not sufficient. This drawback could be overcome at least in part by subjecting the mixture to more rapid recirculation, but then the problems inherent in the presence of the circulator proportionately increase.

No matter what the operational conditions described above, it is moreover always necessary to have a particularly effective phase separator so as to be able to ensure the separation of the water. However, such a separator constitutes a relatively burdensome accessory, occupying a substantial volume and giving rise to problems of inertia in the case of stopping or starting the operation of a fuel cell.

SUMMARY OF THE INVENTION

The present invention relates to a process and installation seeking to eliminate the above drawbacks by using a technical means of small size, low cost, low maintenance and which are adapted to bring about, by alternate circulation, a purge of the water included in the hydrogen circuit of a fuel cell.

To achieve the above object, the purge process, according to the invention, is characterized in that it consists in:
- making each cell so as to comprise a pair of first and second anode compartments,
- connecting the outlet of the first anode compartment to the inlet of the anode circuit of the second anode compartment,
- connecting the outlet of the second anode compartment to the inlet of the first anode compartment,
- connecting the inlets of the anode circuits of the cells with a hydrogen supply circuit through two parallel branches controlled by two opening-closing members,
- periodically controlling the reversal of the conditions of said members.

The invention also has for its object an installation for the practice of the above process, such an installation being characterized in that it comprises
- cells which are each comprised of a pair of first and second anode compartments,
- a connection between the outlet of the first anode compartment and the inlet of the second anode compartment,
- a connection between the outlet of the second anode compartment and the inlet of the first anode compartment,
- a hydrogen supply circuit for the anode circuits of the cells by means of two parallel branches and controlled by two opening-closing members,
- means to control periodically the reversal of the conditions of said members.

BRIEF DESCRIPTION OF THE DRAWINGS

The various other characteristics will become apparent from the description given below with reference to the accompanying drawings which show, by way of non-limiting example, embodiments of the structure and method of the invention.

DETAILED DESCRIPTION OF THE INVENTION

Figure 1:
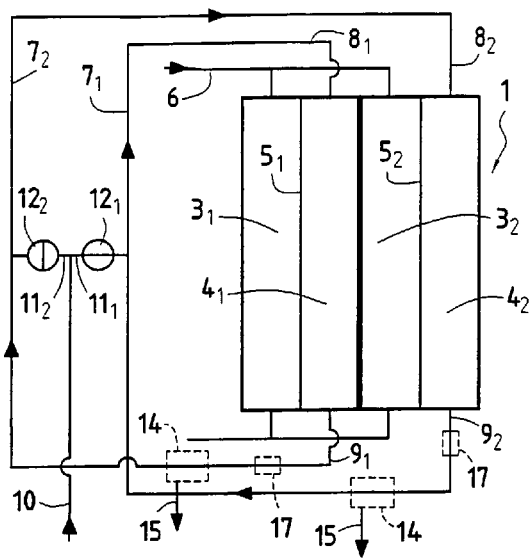
FIG. 1 is a schematic view showing the invention in a simplified embodiment of a fuel cell.

In the simplified embodiment shown in FIG. 1, a fuel cell designated by 1 comprises a cell 2 which is constituted by two half-cells $2_1$ and $2_2$ having the same constituent characteristics. Each half-cell comprises a cathode compartment $3_1$, $3_2$ and an anode compartment $4_1$, $4_2$ each containing a cathode electrode and an anode electrode which are separated by a permeation and reaction membrane $5_1$, $5_2$.

In a conventional manner, the compartments $3_1$ and $3_2$ are connected to a circuit 6 for the supply of an oxidizer such as pure oxygen or air enriched or not in oxygen. Also conventionally, the anode compartments $4_1$ and $4_2$ are connected to a supply circuit for fuel, which is to say hydrogen, which, according to the invention, gives rise to the following structural arrangements.

The hydrogen supply circuit of the half-cell $2_1$ is designated by reference $7_1$ and comprises an inlet $8_1$ and an outlet $9_1$, whilst the corresponding circuit for the half-cell $2_2$ comprises an inlet $8_2$ and an outlet $9_2$.

According to the invention, the outlet $9_2$ of the cell $2_2$ is connected to the inlet $8_1$ of the compartment $4_1$ of the first half-cell. Similarly, the outlet $9_1$ of the compartment $4_1$ is connected to the inlet $8_2$ of the compartment $4_2$ of the second half-cell $2_2$.

The circuits $7_1$ and $7_2$ are moreover connected to a circuit 10 for supplying hydrogen by means of two branches $11_1$ and $11_2$ in parallel and which are controlled by two opening-closing members $12_1$ and $12_2$.

Preferably, but not necessarily, the members $12_1$ and $12_2$ are of the all or nothing type by being reversely conjugated and are controlled to reverse their conditions in a synchronous manner by suitable technical means, such as particularly a timer.

Figure 2:
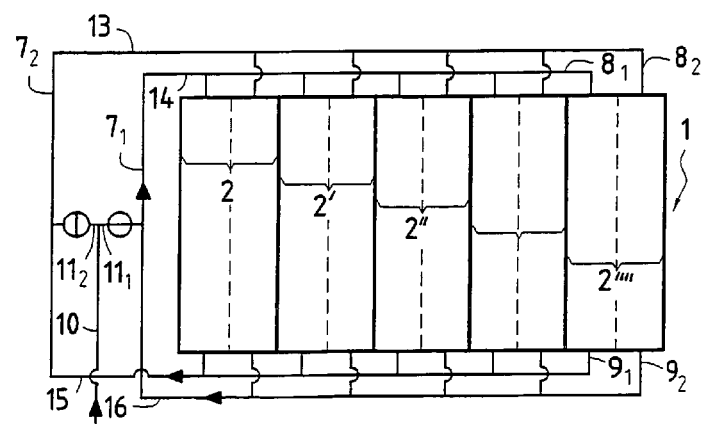
FIG. 2 is a schematic view relating to a fuel cell embodiment comprised by n cells, but depicting only the hydrogen IN/OUT circuits.

The means which are described with respect to the cell 2 are transposable, with the necessary changes having been made, to a fuel cell 1 comprised of n cells 2 as per FIG. 1, such as cells 2', 2" ... 2"", shown in FIG. 2, where only the hydrogen circuits connected to the anode compartments of the cells are depicted.

In such a case, the inlets and outlets of the different cells 2 are connected by collectors 13, 14, 15 and 16, whilst the circuit portions $7_1$ and $7_2$ are connected to the common supply 10 by means of two parallel branches $11_1$ and $11_2$. It must be considered that the equivalent means can be used to assume the same function and that, in certain cases, it is possible to envisage the use of a circuit supplying the two branches and the two members 12 for each cell 2.

In service, as shown in FIG. 1, the member $12_1$ is open whilst the member $12_2$ is closed. As a result, hydrogen under the pressure of the supply circuit 10 flows through branch $11_1$, passes through the open member $12_1$ and enters the circuit $7_1$ to supply hydrogen to the anode compartment $4_1$.

The operative reaction takes place in the usual way in the half-cell $2_1$ whose cathode compartment is supplied with oxidizer.

During this operating phase, the essentially gaseous mixture which leaves the anode compartment $4_1$ flows through the outlet $9_1$ to follow the circuit $7_2$ and to be recycled into the anode compartment $4_2$ of the half-cell $2_2$ whose cathode compartment $3_2$ is also supplied with oxidizer.

The residual hydrogen which is thus recycled is consumed in the half-cell $2_2$ whose compartment $4_2$ is subject, despite non-optimum operating conditions, to mixing or circulation of the gaseous mixture by the recycling of the latter from the outlet of the anode compartment $4_1$.

Figure 3:
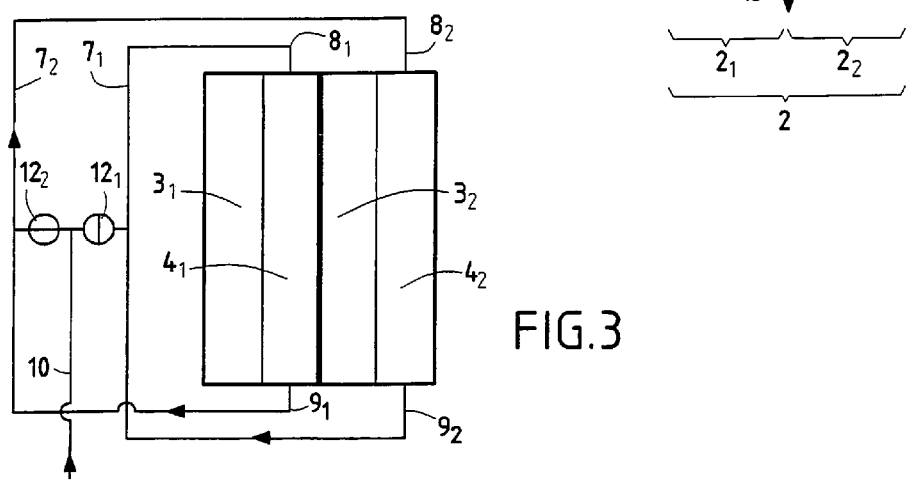
FIG. 3 is a schematic view analogous to FIG. 1 but showing one phase of the process.

After an operating phase characterized by timing of a predetermined duration which may be adjustable, the condition of the members $12_1$ and $12_2$ is reversed as shown in FIG. 3 such that hydrogen is then supplied to the anode compartment $4_2$ whose outlet $9_2$ ensures recycling toward the inlet of compartment $4_1$ of the half-cell $2_1$, of the mixture of gas from the reaction taking place within the half-cell $2_2$.

The same advantages are thus obtained and permit ensuring, under the best conditions, the separation of the included water by interposing, for example at the outlet $9_1$ or $9_2$, or even beyond these two outlets, at least two and preferably two separators 14 having an outlet 15 for the elimination of water.

It must be considered that the members $12_1$ and $12_2$ can be constituted by valves or similar devices and that they can also be replaced by flap valves or other members sensitive to pressure, if desired associated with non-return technical means.

In such a case, the pressure variations which take place as a function of the cyclic supply of one half-cell, and then the other one, permit, as a function of the threshold of adjustment imposed on the members $12_1$ and $12_2$, an automatic reversal of their condition, either by separate control or by conjoint control.

There can also be used, to ensure the same function, detectors of the partial pressure of hydrogen 17 controlling the change of condition of the members $12_1$ and $12_2$.

Figure 4:
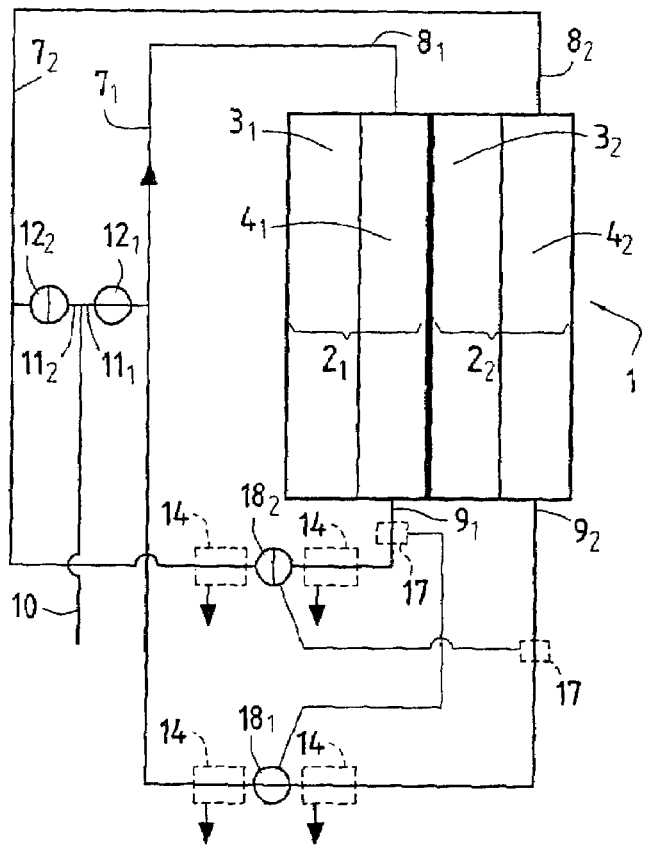
FIGS. 4 and 5 are schematic views analogous to FIGS. 1 and 3, but corresponding to a modified embodiment of the invention.
Figure 5:
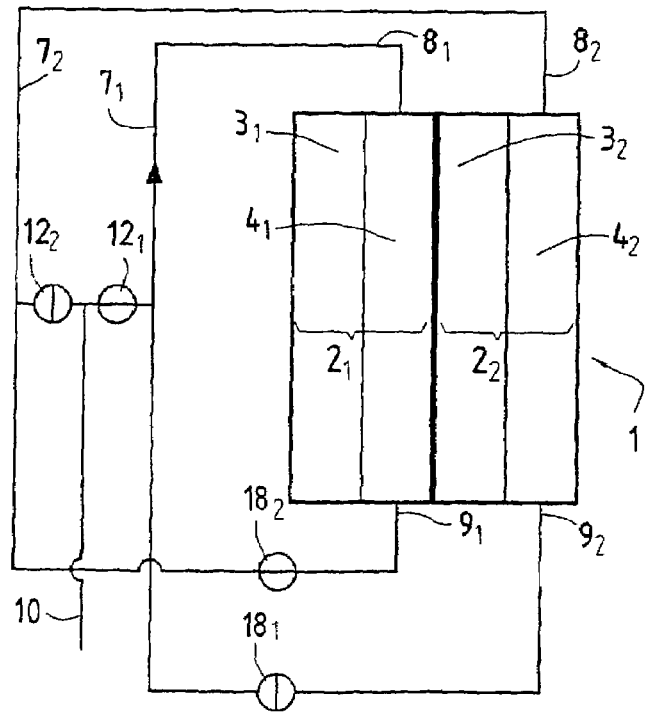

FIGS. 4 and 5 show a modified embodiment in which the outlets $9_1$ and $9_2$ are controlled by members $18_1$ and $18_2$, such as valves, which are controlled reversely in direct relation to the members $12_1$ and $12_2$, by being subjected to analogous conditions of operation. The valves $18_1$ and $18_2$ can also be of the automatic sequence type or, on the contrary, under timed control or under the control of the detection of pressure thresholds, particularly by detectors 17. In such an arrangement, when the supply of the anode compartment $4_1$ is ensured by opening the member $12_1$, the valve 18 is then preferably closed, whilst the valve $18_1$ can be optionally open or closed.

During reversal of supply, the member $12_1$ is closed whilst the member $12_2$ is open and, simultaneously, the valve $18_1$ is closed as shown in FIG. 5.

FIG. 4 shows that at least one separator 17 can be disposed between the outlet $9_2$ and the valve $18_2$ or between the outlet $9_1$ and the valve $18_1$.

It should be considered that a separator 17 can also be disposed downstream of each of the valves $18_1$, $18_2$.

The invention is not limited to the examples described and shown, because various modifications can be given to it without departing from its scope.

The invention claimed is:

1. A fuel system comprising:
   at least a pair of a first cell and a second cell, each cell having an anode compartment with an inlet and an outlet and a cathode compartment with an inlet and an outlet;
   a hydrogen circuit comprising:
      a first distinct loop interconnecting the outlet of the anode compartment of the second cell to the inlet of the anode compartment of the first cell without any connection to any inlet of the second cell,
      a second distinct loop interconnecting the outlet of the anode compartment of the first cell to the inlet of the anode compartment of the second cell without any connection to any inlet of the first cell,
      a supply line selectively connectable to the first and second loops through first and second valve means and control means for alternatively operating said first and second valve means.

2. The system of claim 1, wherein said control means include timing means.

3. The system of claim 1, wherein said control means include pressure sensing means.

4. The system of claim 1, wherein said control means include hydrogen partial pressure measuring means.

5. The system of claim 1, wherein said first and second loop each include a valve downstream of the respective anode outlet, operable under control of said control means.

6. The system of claim 5, wherein said control means operate to alternatively actuate said valves in said first and second loops.

7. The system of claim 1, wherein said first and second loops each include a water separator.

* * * * *